Jan. 23, 1968 E. H. WEST 3,364,804

PIANO TUNING PIN STABILIZER

Filed March 29, 1966

INVENTOR

Emmett H. West

United States Patent Office 3,364,804

Patented Jan. 23, 1968

3,364,804

PIANO TUNING PIN STABILIZER

Emmett H. West, 1062½ Browning Blvd., Los Angeles, Calif. 90037

Filed Mar. 29, 1966, Ser. No. 538,297
2 Claims. (Cl. 84—202)

ABSTRACT OF THE DISCLOSURE

A device to prevent a piano tuning pin from turning so that the piano will remain in tune for a longer period of time, the device comprising a clamping plate that is mounted over several of the tuning pins, the device frictionally holding the pins against turning and unwinding the piano wire.

The present invention generally relates to a tuning pin stabilizer for use on a piano.

An object of the present invention is to provide a structure for stabilizing a piano tuning pin in order to prevent it from turning thereby retaining the piano in tune for a greater length of time than normal.

It is well known that one of the major causes of a piano going out of tune is the turning backwards of the tuning pin due to tension and vibration of the string which tends to unwind the string by turning the tuning pin backwards. Accordingly, it is an important object of the present invention to provide an arrangement whereby the tuning pins will be retained in position against turning backwards but still enabling a tuning key to be employed for adjusting the tuning pins.

A further object of this invention is to provide a tuning pin stabilizer in the form of a clamping plate mounted over a plurality of tuning pins and retained in frictional engagement with annular rings thereon to prevent turning of the pins due to tension in the strings and vibration thereof.

Yet another object of the present invention is to provide a piano tuning pin stabilizer which is simple in construction, easy to install, long lasting and dependable, and relatively inexpensive to manufacture.

Figure 1:
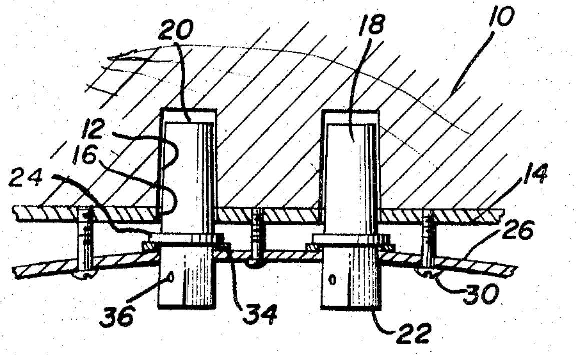
Figure 2:
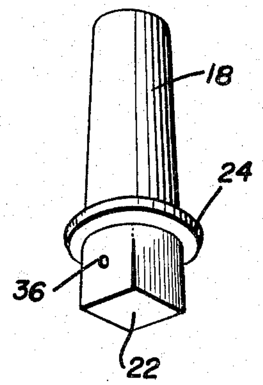
Figure 3:
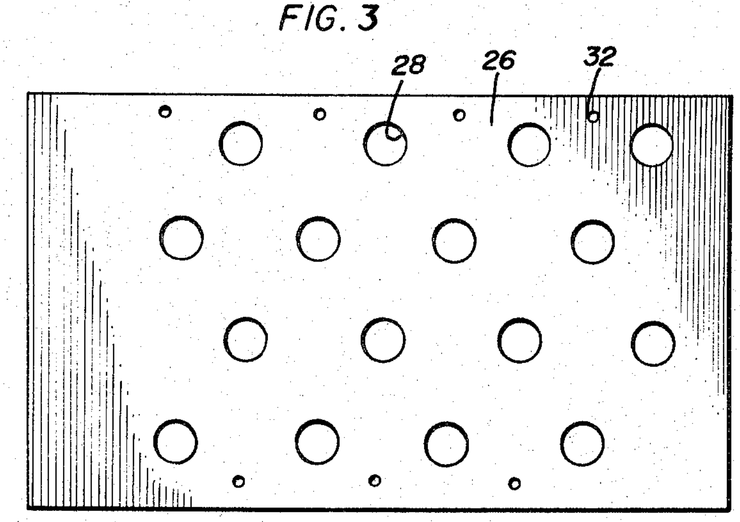

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a sectional view of the piano tuning pin stabilizer and the associated piano structure, FIGURE 2 is a perspective view of one of the tuning pins; and FIGURE 3 is a plan view of the stabilizing plate for engagement over a plurality of tuning pins.

Referring now specifically to the drawings, the numeral 10 generally designates a piano tuning pin block of wood or the like which has a plurality of tapered pockets or sockets 12 formed therein. A metal plate 14 is mounted on the block 10 and has holes 16 aligned with the sockets 12 in block 10.

A tapered tuning pin 18 is mounted in each socket 12 and the taper of the pin is complementary to the socket so that inward movement of the pin will bind the pin in the socket. The inner end of the pin 18 is spaced from the inner end of the socket 12 as indicated at 20 to enable inward movement of the pin 18. The outer end of each pin 18 is square or polygonal at 22 and an annular ring or flange 24 is formed unitarily on each pin 18 for orientation outwardly of the metal plate 14 in spaced relation thereto as illustrated in FIG. 1.

A stabilizing plate 26 is mounted on the pins 18 with the plate 26 having holes 28 to enable the pins to extend therethrough. A plurality of machine screws 30 extend through holes 32 in plate 26 and are screw threaded into plate 14 in order to urge the stabilizing plate 26 toward the block plate 14. A felt washer 34 is mounted on each pin 18 between the ring 24 and stabilizer plate 26 in order to eliminate any possibility of transfer of a false vibration when playing the piano. The piano string would be installed by engaging in the hole 36 in a conventional manner after the stabilizer plate 26 has been installed. The stabilizer plate 26 is provided with a concavity which faces outwardly for purposes of rigidity and will effectively prevent turning of the pins 18 except by use of a tuning key or wrench to overcome the frictional resistance to turning by the axial thrust exerted on the engaging tapered surfaces.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A piano tuning pin stabilizing assembly, comprising a tuning pin block having a plurality of tapered sockets therein, a tapered tuning pin disposed in each socket with the inner end thereof spaced from the bottom of the socket, a peripheral ring rigid with each tuning pin and spaced from said block, a stabilizer plate mounted on said pins for exerting inward force on the pins, means engaged with said plate for urging it toward the block and exerting inward force on the ring of each pin, a felt washer being disposed on each pin between the ring and said stabilizing plate to prevent transfer of vibrations thereto, said means urging the stabilizer plate toward the block including a plurality of screw threaded members extending through the stabilizer plate, a tuning pin block plate rigid with said block, said threaded members being threaded into said block plate.

2. The structure as defined in claim 1 wherein said stabilizer plate has an outwardly facing concavity for rigidifying the plate.

References Cited

UNITED STATES PATENTS

| | | | |
|---|---|---|---|
| 118,354 | 8/1871 | Fass | 84—203 |
| 166,253 | 8/1875 | Branig | 84—202 |

FOREIGN PATENTS

| | | |
|---|---|---|
| 1,401 | 3/1881 | Great Britain. |

RICHARD B. WILKINSON, *Primary Examiner.*

STEPHEN J. TOMSKY, *Examiner.*

EDITH C. SIMMONS, *Assistant Examiner.*